(12) United States Patent
Cook

(10) Patent No.: US 7,459,877 B2
(45) Date of Patent: Dec. 2, 2008

(54) SOLID STATE REVERSING AC MOTOR STARTER WITH DC POWER SOURCE

(75) Inventor: Bruce M. Cook, Pittsburgh, PA (US)

(73) Assignee: Westinghouse Electric Co., LLC, Pittsburgh, PA (US)

(*) Notice: Subject to any disclaimer, the term of this patent is extended or adjusted under 35 U.S.C. 154(b) by 162 days.

(21) Appl. No.: 11/512,474

(22) Filed: Aug. 30, 2006

(65) Prior Publication Data

US 2008/0054840 A1   Mar. 6, 2008

(51) Int. Cl.
*H02P 1/16* (2006.01)

(52) U.S. Cl. .................. 318/778; 318/801; 318/808; 363/123; 363/131; 363/132; 363/40; 363/41; 363/98

(58) Field of Classification Search ............. 318/778, 318/801, 808; 363/123, 131, 132, 40, 41, 363/98
See application file for complete search history.

(56) References Cited

U.S. PATENT DOCUMENTS

| 4,454,930 | A | * | 6/1984 | Nomura et al. | ............ 187/296 |
| 5,055,992 | A | * | 10/1991 | Cook | ............ 363/98 |
| 5,298,848 | A | * | 3/1994 | Ueda et al. | ............ 318/811 |
| 5,481,451 | A | * | 1/1996 | Kuwahara | ............ 363/37 |
| 5,946,208 | A | * | 8/1999 | Yamamoto et al. | ............ 363/132 |
| 6,842,669 | B2 | | 1/2005 | Bednar et al. | |

* cited by examiner

*Primary Examiner*—Rita Leykin

(57) ABSTRACT

A solid state reversing AC motor starter that employs a DC power source and a power bridge employing insulated gate bipolar transistors that provide an ungrounded three phase AC output. The AC output is connected to the power input of the motor starter, which requires simultaneous RUN and Directional Commands to initiate valve actuation.

16 Claims, 6 Drawing Sheets

US 7,459,877 B2

SOLID STATE REVERSING AC MOTOR STARTER WITH DC POWER SOURCE

CROSS REFERENCE TO RELATED APPLICATIONS

This Application is related to co-pending application Ser. Nos. PCT/US07/76953 and PCT/US07/76965 filed concurrently herewith.

BACKGROUND OF THE INVENTION

1. Field of the Invention

This invention relates in general to AC motor starting circuits and more particularly to an AC motor starting circuit employing a DC power source.

2. Background of the Invention

One of the new generation advanced passive nuclear power plants supplied by the Westinghouse Electric Company LLC, Pittsburgh, Pa., known as the AP1000 Plant, has no class 1E AC power source. The plan is to use the 125VDC power station batteries to operate safety grade valves to control various aspects of the nuclear power generation process. The intent is to use DC motors to operate valves that are either too large for solenoid pilot operators or which much have a "fail-as-is" characteristic. It is anticipated that some difficulties may be encountered in procuring and then qualifying DC motors for harsh environments as would be required for deployment within the nuclear island. Furthermore, DC motors will present maintenance difficulties to the utilities due to their brushes which require periodic inspection, cleaning and/or replacement. On the other hand, many operating plants use AC motors in similar applications.

Accordingly, it would be desirable to employ AC motors that have already been qualified for nuclear applications, operated from the nuclear station's 125 volt DC battery source.

Furthermore, it is an object of this invention to provide a solid state reversing AC motor starter with a DC power source that can meet the stringent requirements of nuclear safety systems.

SUMMARY OF THE INVENTION

To achieve the foregoing objects, this invention provides an AC motor starter powered from a DC power source. The motor starter basically comprises a power bridge, an AC power logic circuit and an AC motor starter circuit. The power bridge has a DC input and a three phase AC output. A capacitor input filter is provided across the DC input and a capacitor output filter is connected across each phase of the three phase output.

The power bridge comprises at least six solid state gates respectfully having a gate output individually switchable between an on and off state. Each phase of the power bridge output is connected to respective combinations of the solid state gate outputs.

The AC power logic circuit controls the timing of the switching on and off of the states of the respective gates at a higher frequency than the desired bridge output. The AC power logic circuit varies the duration of the on state of the respective gates so that an output voltage of the three phases can be made to approximate a sine wave using pulse width modulation.

The AC motor starter circuit has a DC power input. The output of the AC motor starter circuit is connected to a three phase motor and operates to drive the motor in a forward or reverse direction by controlling the sequence of the AC phases corresponding to an input command.

Preferably, the AC motor starter circuit includes a motor starter logic circuit that has an open signal input, a close signal input and a run signal input, wherein a run signal and either an open signal or close signal must be present at the corresponding run signal input and open signal input or close signal input for the motor starter circuit to be in an on state to actuate the motor. Preferably, the motor starter logic circuit is configured so that if the run signal is present at the run signal input, the close signal is present at the close signal input and the open signal is present at the open signal input, simultaneously, the motor starter logic circuit will give priority to the open signal to provide a motor output that will rotate the motor in a first direction. Desirably, when the motor is part of a valve actuator the first direction will open the valve. Additionally, in the preferred embodiment, the motor starter logic circuit is configured so that when the run signal, applied to the run signal input and either the close signal, applied to the close signal input or the open signal, applied to the open signal input will be latched for a preselected time so the motor will run for the preselected time even if either or all of the run signal, open signal or close signal are removed during the preselected time. In an application to a valve actuator the preselected time is the time it takes the valve to reach a travel limit. Preferably, the motor starter logic circuit is also configured to block the open signal communicated to the open signal input if the valve is already in an open position or block the close signal communicated to the close signal input if a valve is already in the close position.

In a valve actuated application wherein the valve actuator includes a torque limit switch and a travel limit switch the motor starter logic circuit opens the motor starter output to stop the motor when the torque limit switch changes state or when the travel limit switch changes state. Preferably, the motor starter logic circuit stops the motor when the valve is moving in the open direction when a signal from the travel limit switch changes state and stops the motor when the valve is moving in the close direction when a signal from the torque limit switch changes state. Desirably, the motor starter logic circuit blocks the signal from the torque limit switch at the start of travel until the travel limit switch indicates a change of state. Desirably, the motor starter logic circuit monitors an output of the torque limit switch and if during a preselected time interval after travel of the valve starts, the torque limit switch changes state to cause the motor starter output to open, the motor starter logic circuit is configured to reestablish valve motion when the torque switch again changes state.

In another preferred embodiment, the AC power logic circuit controls the power bridge to provide a reduced voltage output upon start up of the AC motor starter circuit for a preselected period of time after which a full power output is provided to the AC motor starter circuit power input. Desirably the reduced voltage output is increased in a plurality of increments during the preselected period. Additionally, in another preferred embodiment the reduced voltage output is different if the motor starter circuit is connected to turn a motor in the first direction, than if the motor starter circuit is connected to turn the motor in a second direction. In an application to a valve actuator the first direction opens the valve and the second direction closes the valve and the reduced voltage is larger when the AC motor starter circuit is connected to turn the motor in the first direction than when the AC motor starter circuit is connected to turn the motor in the second direction. Desirably, the increments are programmable and some of the increments are longer in time than others of the increments.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENTS

Figure 1:
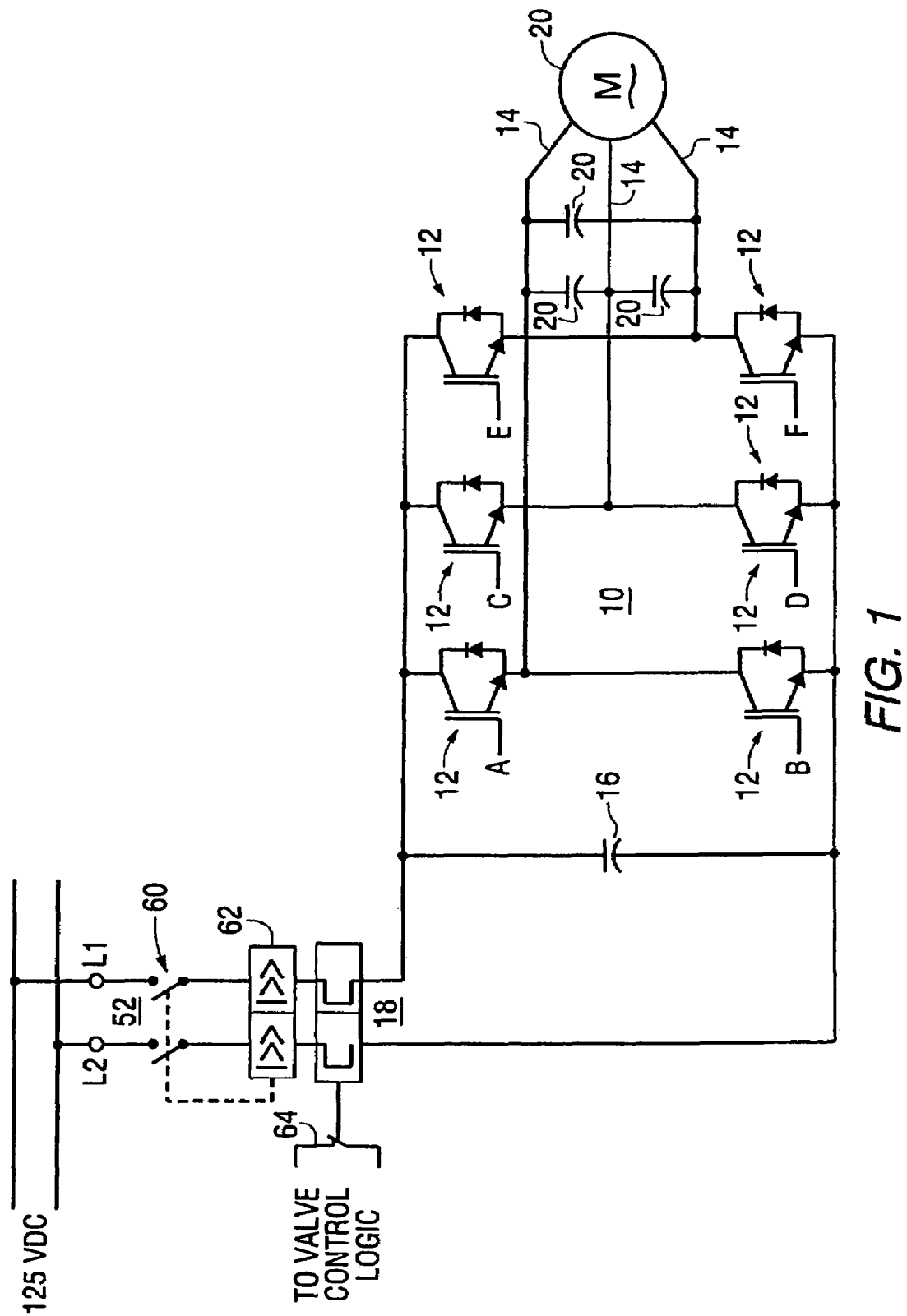
FIG. 1 is an electrical schematic of the power bridge circuit of this invention.

The AP1000 passive nuclear power plant design offered by the Westinghouse Electric Company LLC, Monroeville, Pa., is based on not having any safety grade AC power sources. To the extent that power is needed for plant safety following a design basis event, it will be provided from 125 volt DC station storage batteries. As a result, some of the safety class valves are planned to be operated by DC motors drawing power from these batteries. Some nuclear plants, in particular, boiling water reactors, in the past have used DC motors for valve operation. However, these applications have not required that the motors be qualified for harsh environments. Furthermore, the size of the motors required for the API1000 application, e.g., up to 20 HP or more, would typically operate from voltages higher than the 125 volt DC battery voltage available. In addition, DC motors will present a significant maintenance burden to the utility due to their brushes which must be periodically inspected, cleaned and replaced. In conventional nuclear plant designs the safety grade valves are operated by AC motors that have already been qualified for this type of harsh environment. The subject invention is a motor starter that will enable AC motors to be driven from the available DC supply and meet the stringent requirements for nuclear safety systems.

A motor starter includes all components necessary to control the motor's starting, running and stopping, including protection from short circuits and overload conditions. For the AP1000 passive nuclear power plant, the motor operated valves will have motors ranging in size from 1HP up to 20HP or larger depending upon final valve actuator sizing. The motor size is determined to achieve a 25 second (or less) stroke time at 80% nominal voltage. The following is among the motor starter specifications:

Short circuit protection is to be provided by magnetic type circuit breakers or by fusible disconnect switches.

Thermal overload protection shall be appropriately sized, e.g., per Annex B of IEEE Standard 741-1997, but shall be bypassed upon safety actuation per Nuclear Regulatory Commission Guide 1.106.

The motor starter shall reverse the direction of rotation of the motor by switching the phase sequence order of the motor windings, i.e., abc for opening and acb for closing.

Motors of 5HP in size, or larger, shall be started under reduced voltage to limit the starting current to no more than 250 percent of the rated current. This requirement shall be met at the maximum battery equalization voltage of 140 volts DC.

A single failure within the motor starter or its logic circuits shall not cause spurious motion of the valve.

The motor starter circuits should not rely on software based logic, i.e., microprocessors, so that the chance of common cause failure due to software errors is eliminated.

The latter requirement reflects the fact that the primary and diverse protection systems will both rely on the motor starter to operate the valves necessary to take the remedial action in a design basis event. Therefore, the chance of a common cause failure must be reduced to an absolute minimum. Simplicity of the circuit design is one way of achieving this reduction.

FIG. 1 shows the power bridge circuit 10 of the motor starter of this invention. The power bridge circuit 10 employs insulated gate bipolar transistor (IGBT) devices such as are available from Powerex, Inc. of Youngwood, Pa. The product family called intelligent power modules combines high speed, low loss IGBT's with optimized gate drive and over current and short circuit protection circuitry. The device with part number PM800HSA060 is capable of switching 800 amps at 600 volts. In particular, the motor starter power bridge circuit employs IGBT's devices such as the Powerex PM300CVA060 Intellimod™ IPM six device packages. These devices include high speed, low loss IGBT's with optimized gate drive and protection circuitry. The use of a six device package simplifies the design by allowing the power circuits to share a common heat sink. The 300A and 600V ratings of these devices will be sufficient for all motor sizes needed on the AP1000 plant. The higher rated 800A IGBT's are available from Powerex as individual devices and half bridges and can be configured as well in the circuit arrangement 10 illustrated in FIG. 1.

By controlling the timing of the switching on and off of the IGBT's devices, the sequence of phase energization to the motor is controlled. By switching the IGBT devices 12 at a higher frequency than the desired output, and at varying durations, the output voltages of the three phases 14 can be made to approximate a sine wave by using pulse width modulation (PWM). Capacitor filters 16 on the DC input 18 to the motor starter and capacitor filters 20 on the three phase outputs 14 reduce some of the switching noise to eliminate transients in the power source, and to smooth the output 14 sent to the motor 20, respectively.

Figure 2:
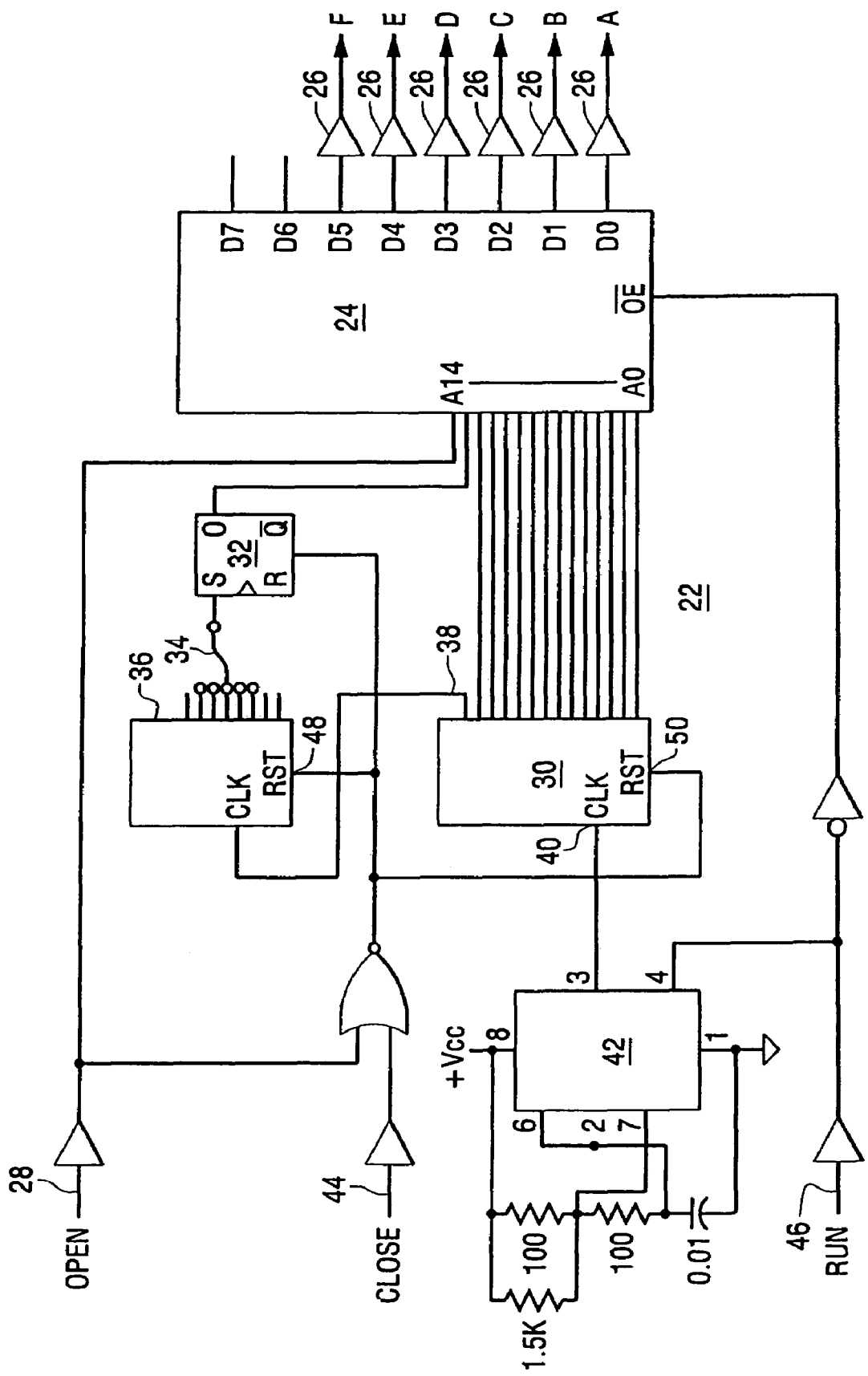
FIG. 2 is a circuit schematic of the AC power logic circuit for controlling the timing of the gates of the power bridge circuit shown in FIG. 1.

An AC power logic circuit 22 to control this three phase power bridge is shown in FIG. 2. The heart of this control logic is a 32K by 8-bit EPROM 24 that stores the PWM waveform representations to drive the IGBT gates 12 illustrated in FIG. 1. The lowest six bits of the output of this device A,B,C,D,E,F, are sent through buffer amplifiers 26 to the gate drive circuits of the IGBT's 12. The EPROM in fact contains four different waveform patterns to represent combinations of clockwise and counterclockwise rotation, and reduced voltage and full voltage output. The address to select the outputs to the gates 12 shown in FIG. 1, comes in three parts. The highest bit A 14 of the address comes directly from the open input 28 to the motor starter. When the open input 28 is HIGH, this input selects the clockwise pair of waveforms and when LOW selects the counterclockwise pair. The lowest thirteen bits of the address come from a 14-bit binary counter 30 that cycles through 8,192 samples of the waveform. The remaining address bit (bit thirteen) comes from a latch 32 whose input is connected by jumper 34 to an output of an 8-bit counter 36 that is cascaded from the highest bit 38 of the 14-bit counter 30. This address bit selects the reduced voltage PWM waveforms (when LOW) or the full voltage waveforms (when HIGH). The input frequency to the 8-bit counter 36 is 30 hz. The jumper 34 selection allows the switching from reduce voltage to full voltage to be in the range of 0.25 seconds to 4 seconds, in multiples of 2. The input clock 40 to the 14 bit address counter 30 is generated by a standard 555 timer circuit 42. With the component values shown, the clock frequency is 491,235 Hz, which when divided by 13-bits of the binary counter 30 becomes 59.97 Hz. If desired, different component values could be selected for 50 Hz operation. Also, a trimming capability could be provided by adding a variable resistor to the timer circuit 42 to permit its frequency to be adjusted so that the output frequency of the motor starter could be fine tuned to match 60 Hz, though this should be traded off against the additional complexity. The motor frequency is not critical since the AC circuits will be independent of all other AC power sources and synchronization will not be required. The motor control logic will receive inputs from a separate valve control motor starter logic circuit by way of three separate signals. Two signals are required to change state in order to cause valve motion, thus providing protection against spurious valve action due to a single failure. The logic inputs from the valve control motor starter logic circuit are OPEN and CLOSE signals, and a separate RUN signal. In order to cause valve motion, the RUN signal and either the OPEN or the CLOSE signal must be present.

The AC motor starter logic circuit could be implemented by means of a standard motor operated valve Component Interface Module CIM sold by the Westinghouse Electric Company LLC, Pittsburgh, Pa., with the RUN signal 46 being generated by wiring the second contact on each of the OPEN and CLOSE output relays in parallel to the RUN input 46 of the motor starter. The Component Interface Module is more fully described in U.S. Pat. No. 6,842,669, issued Jan. 11, 2005, to Westinghouse Electric Company LLC. As stated previously the OPEN input 28 is used as an input to EPROM 24 to select one pair of the PWM waveforms. If either the OPEN signal 28 or the CLOSE signal 44 are present, the reset (clear) inputs 48 and 50 to the counters 30 and 36 and the latch 32 are set to false, thus allowing the cycling of the PWM waveforms. Note that simultaneous OPEN input signals 28 and CLOSE signal 44 will not cause damage (as they would in a conventional contactor based starter). Rather, the OPEN direction simply takes precedence over the CLOSE command. The RUN input 46 is used to release the timer 42 and to enable the outputs of the EPROM 24. As a protection against a spurious RUN signal 46, without a corresponding OPEN input signal 28 or CLOSE signal 44, the EPROM 24 value stored at address 0000 will contain logic zeros to turn off all the IGBT's 12. Thus, two signal commands are necessary; otherwise the inputs are all turned off.

Although not shown, some simple extensions of this concept can be implemented. First, with a small amount of additional logic, the setting of the time delay for reduced voltage starting could be made to be more precise than the simple "power of two" selection shown in FIG. 2 by the jumper 34. In the scheme shown in FIG. 2, the jumper 34 is used to select a single bit from the binary counter 36 to set the flip-flop 32 that selects the full voltage waveform. Since a single bit is used, it can be selected as a "power of two" times the basic time step, i.e., 0.25 sec, 0.5 sec, 1 sec, 2 sec, 4 sec, 8 sec, etc. A more complex circuit could be used to compare the output of counter 36 to a full binary number so that any time value could be chosen in increments of the basic time step. For instance, comparing the output to the number 12 (binary 01100) would give a time delay of 3.0 seconds. Second, by using a larger EPROM device additional PWM waveforms could be stored to produce various reduced voltage outputs. This would allow multiple staged starting with very large motors to keep the starting current to a reasonable level while providing the most torque available for valve motion. Third, since motor operated valves will generally require more starting torque when opening the valve (to break free of the valve seat) than when closing, the reduced voltage PWM waveforms for the opening direction could be different (e.g., higher values) than those for closing. Finally, instead of using a cascaded output of the 14-bit cycle counter as the clock input to the reduced voltage delay timer, the clock (at a higher frequency) could be stored in the eighth bit of the EPROM contents. This would allow the delay clock frequency, hence the delay period, to be programmed to be different for each reduced voltage stage. For example, if every $64^{th}$ slice of the PWM waveform has the most significant bit set to "1", the delay clock frequency will be 7,675 Hz, while by using every $96^{th}$ slice, the frequency becomes 5,117 Hz. A fixed count of a variable clock gives a variable delay. The full voltage PWM waveform would contain no delay clock pulses, therefore the delay timer would stop running, and that waveform would be applied indefinitely. This approach would allow a custom motor start pattern to be developed for each motor size, torque requirement and to be changed by reprogramming the EPROM 24.

As described previously, the three phase outputs 14 shown in FIG. 1 are approximated by using a pulse width modulation technique. To do this, the 16.667 millisecond (1/60 Hz) period is divided into 256 cells. Each cell is further divided into 32 time slices. The product of the 256 cells times the 32 slices provides the 8,192 samples that are stored in the EPROM 24. In each cell the number of slices that are ON (logic 1) is proportional to the value of a sine function with the total number of cells being one period of the sine wave. By equation, this is:

$$N_i = 32 \times R \times \sin\left(\frac{\pi \times i}{128}\right) \quad (1)$$

In equation (1), R is the reduction factor for reduced voltage output. The EPROM bits 26 are set to ONE for the number of slices in a given cell corresponding to the value of $N_i$ from the equation. If the value is positive, the bit associated with the IGBT 12 connecting to the +125VDC input 52 is set (i.e., A, C or E) and if it is negative the bit associated with the minus input is set (i.e., B, D or F). For increasing output values, the later slices in the cell are set true while on decreasing values, the earlier slices are true with the later ones being a logic false. The count of "ON" slices for the second phase (C-D) of the AC output 14 are shifted by eighty-five cells (approximately 120°), in other words, the count at cell eighty-five for C-D is the same as that for cell zero of A-B, the value at cell eighty-six (C-D) is the same as cell one of (A-B), etc. Similarly, the values for phase E-F lead those of A-B by eighty-five, i.e., the value of cell zero (E-F) is that of cell eighty-five of (A-B) etc. For reverse motion C-D and E-F values are swapped.

Figure 3:
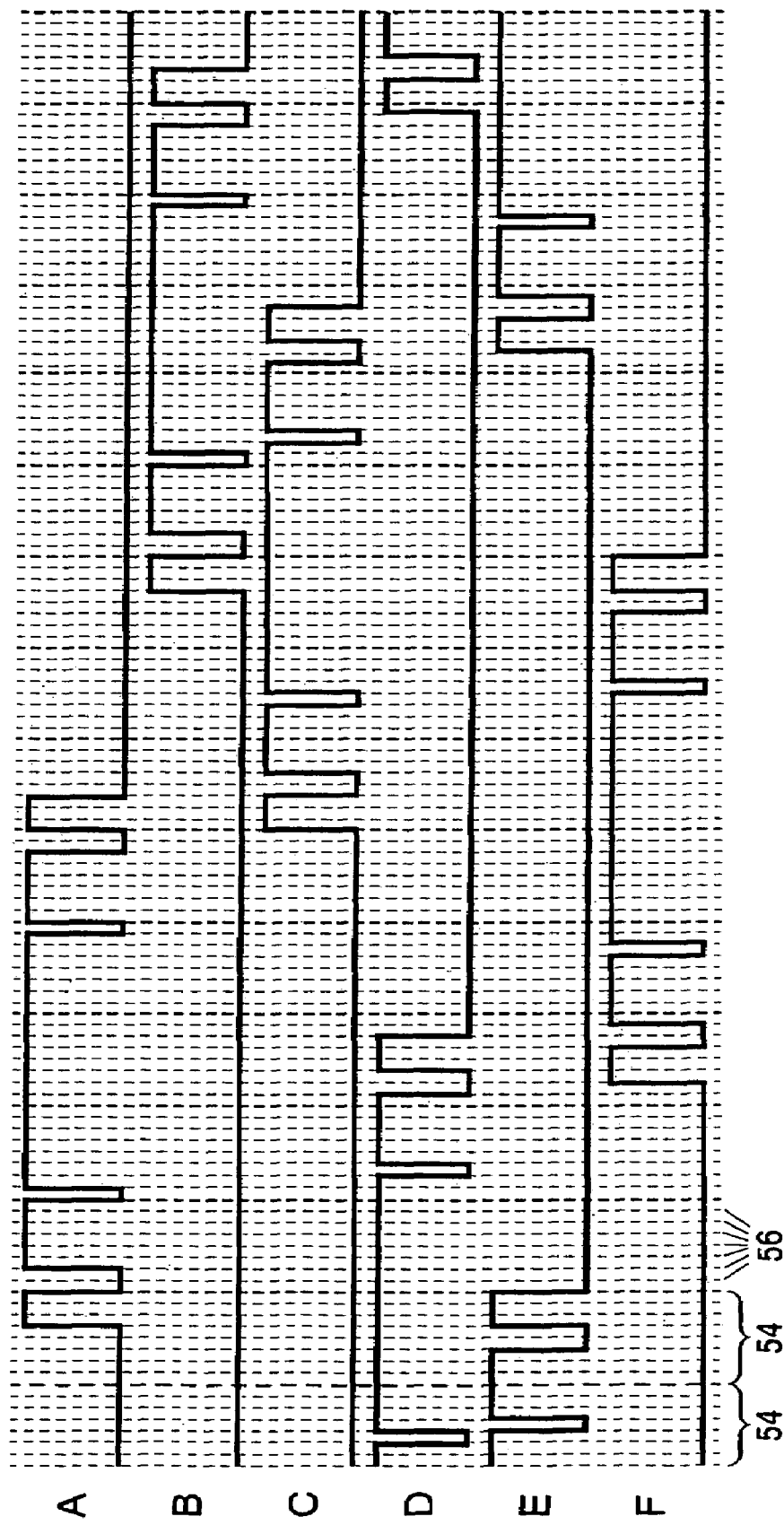
FIG. 3 is a graphical illustration of the pulse width modulation technique.

To illustrate these PWM waveforms, FIG. 3 shows the six EPROM output signals 26, but with only sixteen cells 54 of eight slices 56 each. As it can be seen in this figure, the shift between A and C (and A and E) waveforms is not a whole number of cells, rather, in this case, is five cells and three slices. This provides a truer alignment between the three phases 14. In the preferred implementation with two hundred fifty-six cells each with thirty-two slices, the waveform shift will be eighty-five cells 54 plus eleven slices 56. In this case, the phase angle error will be less than 0.02° which is quite tolerable.

Figure 4:
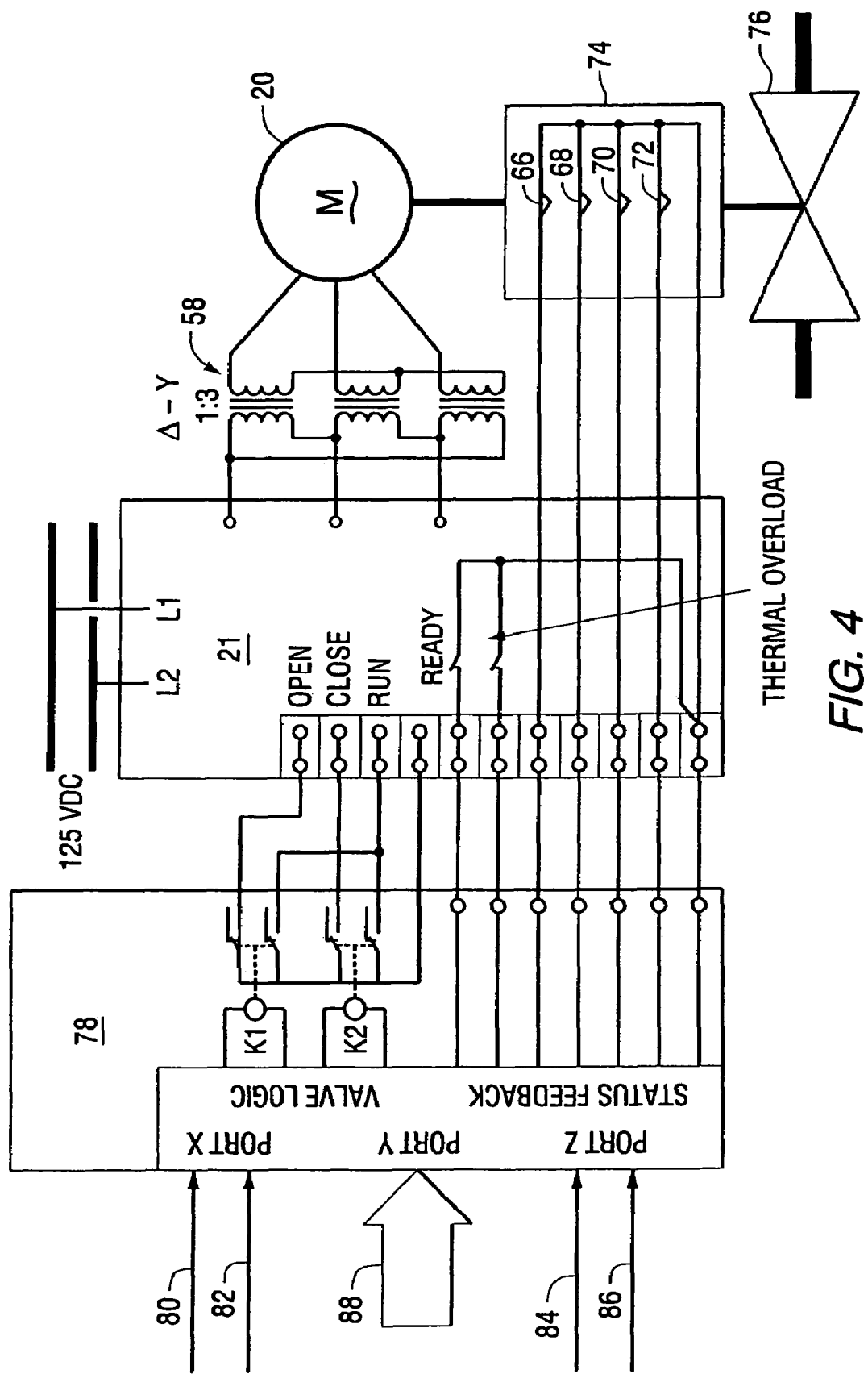
FIG. 4 is a schematic illustration of a motor operated valve controller using the solid state motor starter of this invention; and And FIG. 5. is a block diagram of the valve control logic employed by the solid state reversing AC motor starter of this invention.

A consequence of this three phase inverter is that the peak-to-peak AC voltage on the output is limited to the DC input voltage, i.e., 125V. Therefore, the RMS voltage output is 44.2 VAC. In order to supply the proper voltage to the motor 20, it will be necessary to use a step-up transformer between the motor starter 21 and the motor 20 as shown in FIG. 4. With a one to three turns ratio and a delta-wye connection, a standard motor voltage of 230 VAC is produced. A one to six turns ratio will produce 460 VAC.

The remaining components of the motor starter are the protection devices that prevent over current conditions. The first is a magnetic operated circuit breaker 60 shown in FIG. 1, that provides short circuit protection. It is a two pole device rated for DC operation that will interrupt both lines. This is required since the power source is ungrounded. This device must carry the LRA (Locked Rotor Current) without interrupting, but must interrupt current at a value less than the upstream protection for the entire motor control center of the safety division.

The second protection device is a thermal overload relay 62 (shown in FIG. 1). The thermal overload relay provides a contact output 64 to the motor starter logic circuit (such as is performed in the Component Interface Module discussed above). Under conditions of normal valve operation, the overload signal 64 will interlock the output commands to stop the motor on an overload condition. If the valve command is due to a safety system actuation, the overload interlock is blocked and the motor is allowed to continue to operate until the valve stroke limit is reached (as determined by limit switch 70 or 72 and/or torque switch 66 or 68) or until the motor burns out. In either case, an alarm signal is generated by the motor starter logic circuit. Both of these protection devices are commercially available from various electrical equipment manufacturers as standard catalog items. The thermal overload device could be located as shown in FIG. 1 or could alternatively be a three pole (phase) device located in the outputs 14 to the motor 20, downstream of the transformers 58. In this latter case, the sizing of the device would be similar to that for conventional motor starters.

The preferred embodiment of the solid state AC motor starter employing a DC power source of this invention in an application to a motor operated valve controller is illustrated in FIG. 4. The valve assembly consist of the motor 20, a valve actuator 74 that provides speed reduction gearing for conversion of the rotary motion of the motor 20 to linear valve stem motion, and the valve itself 76. The valve actuator 74 contains four limit switches 66, 68, 70 and 72, two operated by motor torque 66 and 68, one in the open direction and the other in the close direction, and two by valve stem position 70 and 72 respectively in the open and closed positions. The logic for the issuing commands from the instrumentation and control systems to the motor starter is performed by the Component Interface Module 78 previously discussed above. The logic performed by the Component Interface Module 78 is jumper configurable to accommodate various plant equipment.

Figure 5A:
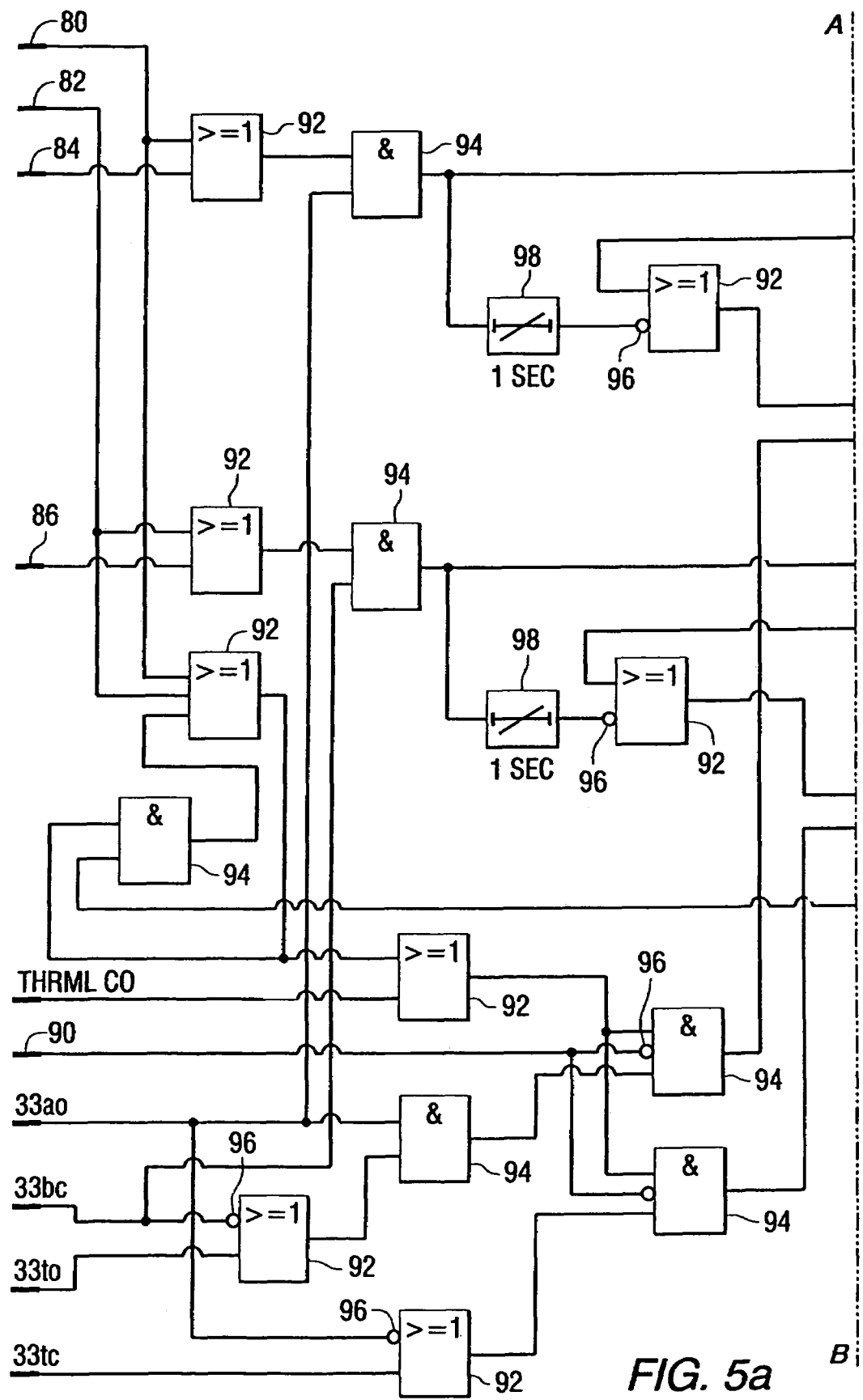
Figure 5B:
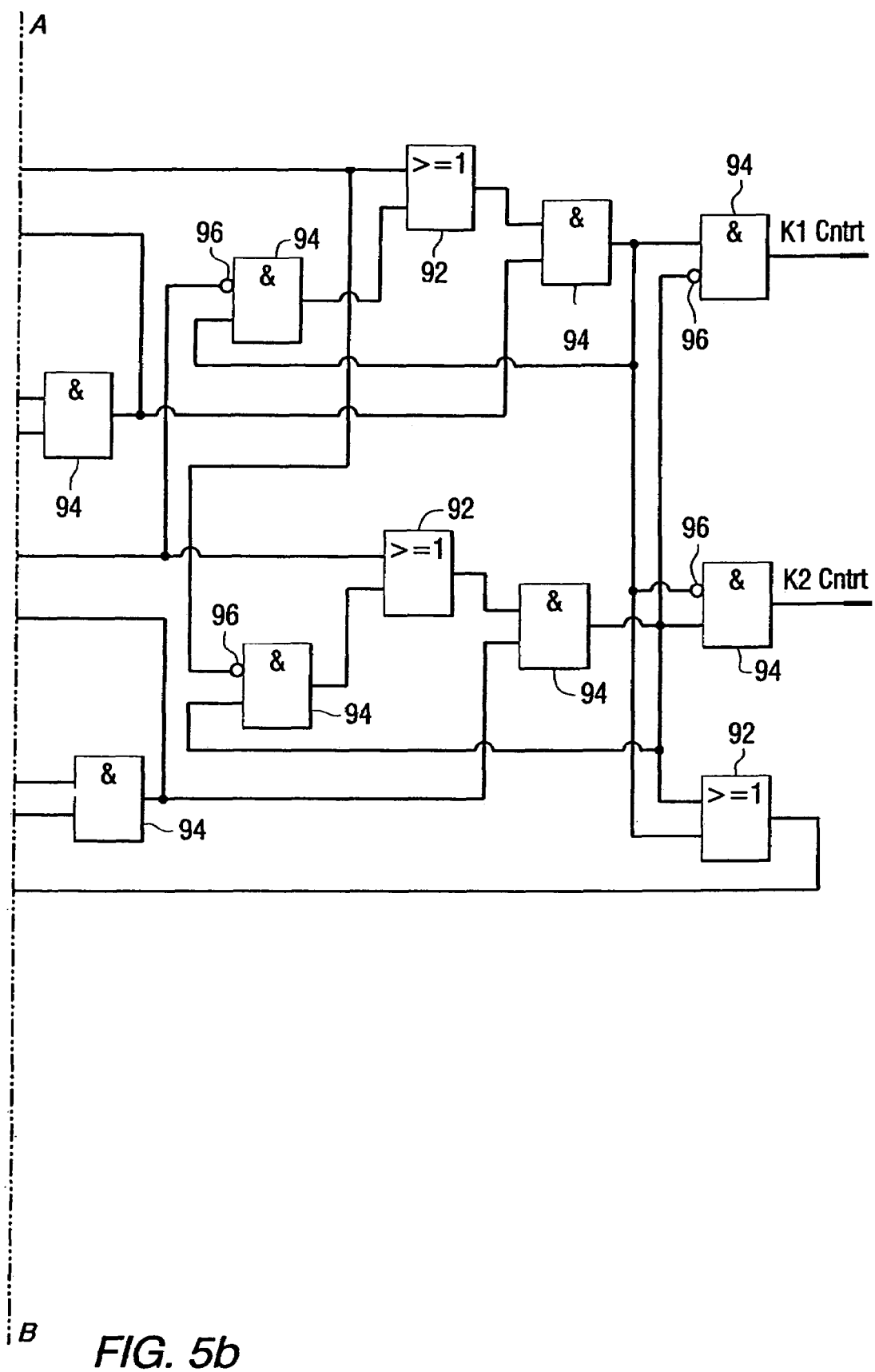

The logic to control the valve 76 that is driven from the motor starter 21 is shown in FIG. 5. This logic is derived from the universal Component Interface Module 78 logic. For clarity, the configuration jumpers are not shown. Also features of the universal logic provided for the purpose of diagnostics and maintenance have been omitted from this figure for clarity. The valve control logic shown in FIG. 5 is made up of OR gates 92, AND gates 94, inverted inputs 96 and time delay circuits 98 and has the following attributes:

Commands from the Instrumentation and Control System enter as normal OPEN/CLOSE 84,86 or safety OPEN/CLOSE signals 80,82. Usually the safety system will only use one of these commands. The Normal commands arrive to the Component Interface Module 78 via the Input/Output Module 88 of the Distributed Processing System of the Instrumentation and Control System.

Commands are latched in the Component Interface Logic 78 so that if the originating command is removed, travel will continue until the travel limit is reached.

If the system command inputs are maintained longer than the stroke time of the valve, the relay outputs K1, K2 are nevertheless turned off when the travel limit is reached so there is no standing voltage input to the motor starter.

The 33*ao* and 33*bc* inputs are valve position limit switch inputs that are both closed (logic true) when the valve is in mid stroke. The corresponding switch opens when the valve reaches its travel limit in that direction.

Commands are blocked in the direction corresponding to the present state of the valve. In other words, if the valve is already open, an OPEN command will not issued.

The 33*to* and 33*tc* inputs are torque limit switch inputs that are normally closed, and that open when the motor torque applied to the actuator exceeds a set value in the corresponding direction of travel. If a torque switch opens during valve travel, both output relays to the motor 20 are turned off thus stopping the motor. In the opening direction the output relay is turned off when the position limit switch opens, however, in the closing direction, the output is not turned off until the torque switch opens. This ensures a tight closing of the valve.

At the start of valve motion, the torque switch is blocked until the opposite position switch changes state indicating that the valve is "off seat".

During the first second of valve travel, if the torque switch, 68, 70, causes the output to the motor 20 to turn off, the output will be re-established when the torque switch recloses. This protects against contact bounce that may occur on the torque switch. After this initial second, the state of the torque stop is memorized such that the command must be removed and reinitiated to cause motion to begin again.

The READY input 90 is a normally closed contact on the magnetic circuit breaker 60 in the motor starter 21 that opens when the breaker is closed. If this input becomes true (contact closed) commands to the motor starter are blocked.

The THRML CO input is a normally closed contact of the Thermal Overload Protection relay in the motor starter. In the event of an overload condition, this contact opens causing a false logic state.

If the command from the Instrumentation and Control System was a "Normal" command, opening the Thermal Overload Protection input will cause the output relays K1, K2 to be de-energized and the motor 20 will be stopped. However, if the command was a "Safety" command, this interlock is blocked. This block is latched until the output relays are de-energized so that if the safety command is removed during valve motion, the block remains in effect until the end of valve travel.

All of the Component Interface Module 78 inputs, the output states and various internal logic states are made available to the Control and Instrumentation System via the remote Input/Output bus 88 of the Distributed Processing System for the purpose of state signalization (indication), alarm generation and discrepancy logic.

Accordingly, this invention provides a solid state reversing AC motor starter that meets the stringent requirements of a nuclear safety system and can be powered from a nuclear power station's DC battery voltage. The invention enables currently qualified AC motors to be employed as valve operators in the next generation of nuclear plants. While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breath of the appended claims and any and all equivalents thereof.

What is claimed is:

1. A solid state AC motor starter with DC power source comprising:
   a DC input;
   a capacitor input filter connected across the DC input;
   a power bridge comprising:
      at least six gates respectively having a gate output individually switchable between an on and off state;
      a power bridge output having three phases, each phase of the bridge output being connected to respective combinations of the gate outputs;
   a capacitor filter connected across each phase of the three phase output;
   an AC power logic circuit for controlling the timing of the switching on and off of the states of the respective gates at a higher frequency than the desired bridge output and varying the duration of the on state of the respective gates so that an output voltage of the three phases can be made to approximate a sine wave using pulse width modulation; and
   an AC motor starter circuit having an AC power input connected to the power bridge output;
wherein the AC motor starter circuit includes a motor starter logic circuit that has an open signal input, a close signal input and a run signal input wherein a run signal and either an open signal or a close signal must be present at the corresponding run signal input and open signal input or close signal input for the motor starter circuit to be in an on state to actuate a motor.

2. The AC motor starter of claim 1 wherein if the run signal is present at the run signal input, the close signal is present at the close signal input and the open signal is present at the open signal input, simultaneously, the motor starter logic circuit will give priority to the open signal to provide a motor output that will rotate the motor in an open direction.

3. The AC motor starter of claim 1 wherein the run signal, applied to the run signal input and either the close signal, applied to the close signal input or the open signal, applied to the open signal input will be latched for a preselected time so the motor will run for the preselected time even if either or all of the run signal, open signal or close signal are removed during the preselected time.

4. The AC motor starter of claim 3 wherein the motor is part of a valve actuator and the preselected time is the time it takes the valve to reach a travel limit.

5. The AC motor starter of claim 1 wherein the motor is part of a valve actuator and the motor starter logic circuit is configured to block the open signal communicated to the open signal input if the valve is already in an open position or block the close signal communicated to the close signal input if the valve is already in the closed position.

6. The AC motor starter of claim 1 wherein the motor is part of a valve actuator and further includes a torque limit switch which changes state if torque applied to the valve actuator exceeds a set value, the change of state is communicated to the motor starter logic circuit which is responsive thereto to open a motor starter output that is connected to the motor and stop the motor.

7. The AC motor starter of claim 6 including a travel limit switch that changes state when a valve driven by the valve actuator reaches its limit of travel wherein the change of state of the travel limit switch is communicated to the motor starter logic circuit which is responsive thereto to open the motor starter output.

8. The AC motor starter of claim 7, wherein the motor starter logic circuit (i) upon receiving a signal representative of the change of state of the travel limit switch when the valve is moving in an open direction is configured to open the motor starter output and (ii) upon receiving a signal representative of the change of state of the torque limit switch when the valve is moving in the close direction is configured to open the motor starter output.

9. The AC motor starter of claim 8 wherein the motor starter logic circuit blocks the signal from the torque limit switch at the start of valve travel until the travel limit switch indicates the change of state.

10. The AC motor starter of claim 9 wherein the motor starter logic circuit monitors an output of the torque limit switch and if during a preselected time interval after travel of the valve starts the torque limit switch changes state to cause the motor starter output to open, the motor starter logic circuit is configured to re-establish valve motion when the torque switch again changes state.

11. A solid state AC motor starter with DC power source comprising:
    a DC input;
    a capacitor input filter connected across the DC input;
    a power bridge comprising:
       at least six gates respectively having a gate output individually switchable between an on and off state;
       a power bridge output having three phases, each phase of the bridge output being connected to respective combinations of the gate outputs;
    a capacitor filter connected across each phase of the three phase output;
    an AC power logic circuit for controlling the timing of the switching on and off of the states of the respective gates at a higher frequency than the desired bridge output and varying the duration of the on state of the respective gates so that an output voltage of the three phases can be made to approximate a sine wave using pulse width modulation; and
    an AC motor starter circuit having an AC power input connected to the power bridge output;
    wherein the AC power logic circuit controls the power bridge to provide a reduced voltage output upon startup of the AC motor starter circuit for a preselected period of time after which a full power output is provided to the AC motor starter circuit AC power input.

12. The AC motor starter of claim 11 wherein the reduced voltage output is increased in a plurality of increments during the preselected period.

13. The AC motor starter of claim 11 wherein the reduced voltage output is different if the motor starter circuit is connected to turn a motor in a first direction than if the motor starter circuit is connected to turn the motor in a second direction.

14. The AC motor starter of claim 13 wherein the AC motor starter circuit is connected to a motor operated valve and the first direction opens the valve and the second direction closes the valve and the reduced voltage is larger when the AC motor starter circuit is connected to turn the motor in first direction than when the AC motor starter circuit is connected to turn the motor in the second direction.

15. The AC motor starter of claim 12 wherein some of the increments are longer in time than others of the increments.

16. The AC motor starter of claim 15 wherein the time each increment is applied is programmable.

* * * * *